US008073925B2

(12) United States Patent
Wheeler et al.

(10) Patent No.: US 8,073,925 B2
(45) Date of Patent: Dec. 6, 2011

(54) DEVICE MANAGEMENT SYSTEM AND METHOD

(75) Inventors: Phil Wheeler, Camas, WA (US); Eric Olbricht, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1126 days.

(21) Appl. No.: 10/870,595

(22) Filed: Jun. 16, 2004

(65) Prior Publication Data

US 2006/0047796 A1 Mar. 2, 2006

(51) Int. Cl.
*G06F 15/16* (2006.01)
(52) U.S. Cl. ......... 709/217; 709/202; 709/203; 709/219
(58) Field of Classification Search ............... 709/202, 709/203, 231, 219
See application file for complete search history.

(56) References Cited

U.S. PATENT DOCUMENTS

| | | | | |
|---|---|---|---|---|
| 4,497,037 | A * | 1/1985 | Kato et al. | 399/80 |
| 4,866,707 | A * | 9/1989 | Marshall et al. | 714/749 |
| 5,414,494 | A * | 5/1995 | Aikens et al. | 399/1 |
| 5,673,190 | A * | 9/1997 | Kahleck et al. | 700/2 |
| 5,787,253 | A * | 7/1998 | McCreery et al. | 709/231 |
| 5,937,162 | A * | 8/1999 | Funk et al. | 709/206 |
| 5,987,432 | A * | 11/1999 | Zusman et al. | 705/35 |
| 6,023,723 | A * | 2/2000 | McCormick et al. | 709/206 |
| 6,112,039 | A * | 8/2000 | Salgado et al. | 399/79 |
| 6,298,308 | B1 * | 10/2001 | Reid et al. | 702/56 |
| 6,381,241 | B1 * | 4/2002 | Ghirnikar et al. | 370/394 |
| 6,389,464 | B1 * | 5/2002 | Krishnamurthy et al. | 709/220 |
| 6,691,116 | B1 * | 2/2004 | Bart | 707/10 |
| 6,697,942 | B1 * | 2/2004 | L'Heureux et al. | 713/152 |
| 6,844,937 | B2 * | 1/2005 | Dempsey et al. | 358/1.13 |
| 6,958,690 | B1 * | 10/2005 | Asher et al. | 340/531 |
| 7,272,576 | B2 * | 9/2007 | Matsugi | 705/29 |
| 7,325,054 | B2 * | 1/2008 | Ishimoto | 709/224 |
| 2002/0013731 | A1 * | 1/2002 | Bright et al. | 705/22 |
| 2002/0077777 | A1 * | 6/2002 | Wolfe et al. | 702/182 |
| 2002/0091776 | A1 * | 7/2002 | Nolan et al. | 709/206 |
| 2002/0131079 | A1 * | 9/2002 | Forbes et al. | 358/1.15 |
| 2003/0023736 | A1 * | 1/2003 | Abkemeier | 709/229 |
| 2004/0215533 | A1 * | 10/2004 | Doeberl et al. | 705/30 |
| 2004/0246520 | A1 * | 12/2004 | Obert | 358/1.15 |
| 2005/0076052 | A1 * | 4/2005 | Kojima | 707/102 |
| 2005/0125321 | A1 * | 6/2005 | Gerstner et al. | 705/35 |
| 2005/0204012 | A1 * | 9/2005 | Campbell | 709/206 |
| 2005/0210116 | A1 * | 9/2005 | Samson | 709/207 |
| 2005/0256930 | A1 * | 11/2005 | Pearson et al. | 709/206 |

FOREIGN PATENT DOCUMENTS

JP 02311044 * 12/1990
JP 02311044 A * 12/1990

* cited by examiner

*Primary Examiner* — Emmanuel L Moise
*Assistant Examiner* — Sarah Drabik
(74) *Attorney, Agent, or Firm* — Stolowitz Ford Cowger LLP

(57) ABSTRACT

A device management system and method is provided. The device management system and method includes a transmission server to transmit a communication from at least one device. A reception server receives the communication from the at least one device. And a device manager coupled to the reception server manages the at least one device by automatically parsing the communication received by the reception server. The device manager authorizes the communication for further processing where the device manager includes a device list including identification data associated with the at least one device. The device manager includes an alert processing component that generates an alert message responsive to the device list.

5 Claims, 9 Drawing Sheets

DEVICE MANAGEMENT SYSTEM AND METHOD

BACKGROUND

1. Field

The invention relates to a device management system and method.

2. Related Art

Office equipment manufacturers often lease office equipment to business owners either directly or through dealers (collectively dealers). Office equipment might comprise fax, copy, scan, printing, or multi-function devices or machines. The lease fee may be based on "clicks:" the number of faxes, copies, scans, and/or printouts run through the leased device. The lease fee may additionally be based on consumable usage. That is, on the amount of paper, toner, ink, and the like used by the business owner during a predetermined period.

The dealers must proactively replenish necessary supplies to the leased devices. And the dealers are responsible for maintaining the leased devices in proper working order, as well as keeping track of the clicks and consumable usage. To this end, the dealers have developed manual and semi-automated means of collecting the click counts and consumable usage on the leased devices. The leased devices are notably often located geographically distant from the dealer.

Manually collecting click counts involves a dealer representative visiting the business owner on a regular basis to inspect the leased device. The dealer representative obtains the click counts by, e.g., pressing a predetermined sequence of buttons on the device's front panel. During the visit, the dealer representative may also stock the business owner with needed consumables based on the clicks obtained from the device. For billing purposes, the representative may manually input the click count and consumable usage into a dealer management system designed to generate lease bills. Alternatively, the business owner obtains and then faxes the click counts and usage to the dealer. The dealer then manually inputs the click counts and usage into the dealer management system.

Semi-automatically collecting click counts involves coupling the leased device to a computer network and providing the leased device with the ability to automatically generate a status report. The status report may include the click counts and certain other status information.

FIG. 1 is a diagram of a conventional semi-automatic system 100. Referring to FIG. 1, a system 100 includes a plurality of devices, e.g., 110A, 110B, and 110C, networked to a site server 120 through network capable devices, e.g., network interface cards (NICs) (not shown) installed in the devices 110A, 110B, and 110C. The plurality of devices 110A, 110B, and 110C are leased to a customer 130. The site server 120 may be coupled to a dealer server 150 through a global communication network 140, e.g., the Internet®. A plurality of customers like customer 130 may be coupled to the dealer server 150 through the network 140. The dealer server 150 may receive the status report directly and automatically from the leased device, e.g., device 110A. A person 160 downloads the status report from the server 150. A person 170 gets the status report from the person 160 and then manually inputs the information to a dealer management system 180. The dealer management system 180, in turn, automatically generates a bill to the customer 130. Persons 160 and 170 may be the same person or they may be distinct persons.

A disadvantage to manual and semi-automatic data collection is cost. As manual labor costs increase, so do costs associated with visits to collect and input click counts. Manual data collection and input is fraught with errors. And manual and semi-automatic click count and other data collection takes valuable time away from the dealer's staff, time needed to respond to consumable calls for restocking paper, toner, and drums, conducting preventative maintenance, and/or servicing leased device breakdowns Accordingly, a need remains for an improved device management system and method.

BRIEF DRAWING DESCRIPTION

DETAILED DESCRIPTION

Figure 1:
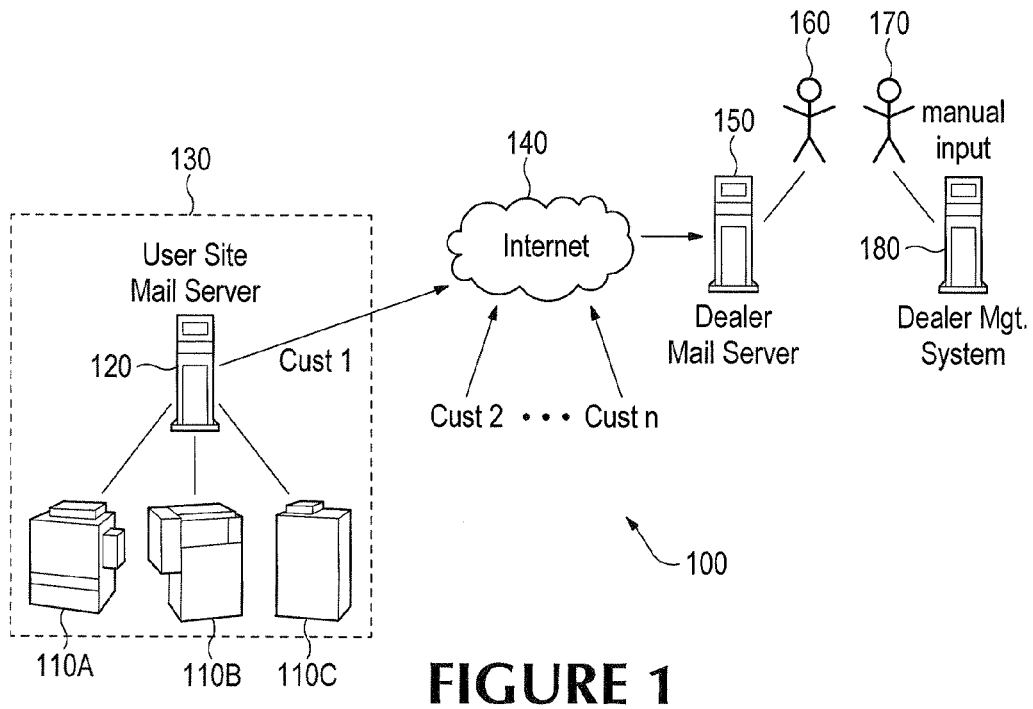
FIG. 1 is a diagram of a conventional system.

The following description illustrates embodiments of the present invention. Numerous other embodiments are contemplated and the description is intended only to illustrate, and not limit, the present invention. Like reference numerals throughout the drawings denote like structures.

Figure 2:
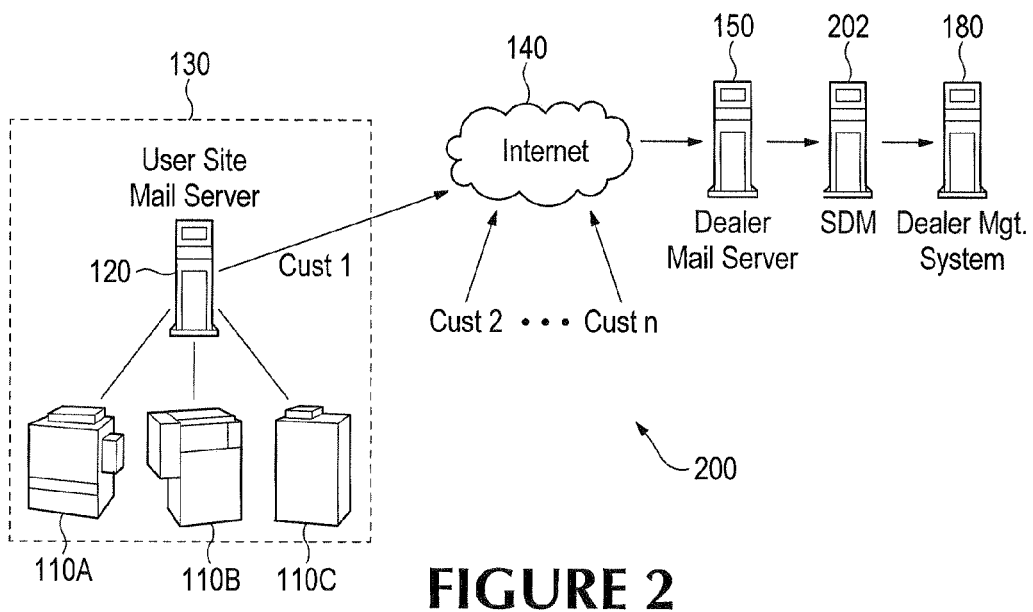
FIG. 2 is a diagram of an exemplary system including a device management system according to the present invention.

FIG. 2 is a diagram of an exemplary system including a device management system 202 according to the present invention. Referring to FIG. 2, the system 200 includes a plurality of devices, e.g., 110A, 110B, and 110C, networked to a site server 120 through network capable devices, e.g., network interface cards (NICs) (not shown) installed in the devices 110A, 110B, and 110C. The plurality of devices 110A, 110B, and 110C are leased to a customer 130, e.g., a business owner. The site server 120 may be coupled to a dealer server 150 through a global communication network 140, e.g., the Internet®. A plurality of customers like customer 130 may be coupled to the dealer server 150 through the network 140. A person of reasonable skill in the art knows well the design of devices 110A, 110B, and 110C, servers 120 and 150, and circuitry necessary to network the devices to the servers, e.g., NICs. We will not discuss these devices, servers, and circuitry in any further detail.

The devices 110A, 110B, and 110C automatically generate a status report. The status report may be any communication, e.g., email, automatically generated by the device 110A, 110B, or 110C and capable of being transmitted to the servers 120 and 150. The status report may include all manner of status information, including device identification information (e.g., serial number), device operating status (e.g., on or off line, paper jam, malfunction indication), consumable status (e.g., paper, toner, and/or ink levels), etc.

The status report may include a title, a body, and any number of attachments. The body of the status report may be a short summary of the information contained in the attachments. The body may include the click counts and identify the reporting device (e.g., by providing a serial number). The body may be readily human readable while the attachments may not. The attachments may include machine readable binary data. The attachments may include the click counts as well as other more detailed status information, including toner level, serial number, connection status, server identification, network gateway identification, and the like. The status report may further be designated as an alert or status message.

For simplicity, we will refer to the status report as an email. But a person of reasonable skill in the art should recognize that the present invention is not limited to emails. Rather, the present invention contemplates that any type of communication capable of being transmitted from a server 120 to a server 150 and generated by any electronic device to indicate its status comes within the scope the present invention. The incoming email accounts may be specified by a user, e.g., a dealer or business owner, during application configuration. The email addresses configured during application configuration may include incoming, archive, exception, alert, and self identity email addresses.

Table 1 is an example status report generated by a device, e.g., device 110A.

TABLE 1

| Field | Example |
| --- | --- |
| Date/Time | 2000/02/27 |
| DEVICE | Cougar34 |
| DEVICE | SHARP AR- |
| LOCATION | $2^{nd}$ Floor |
| SERIAL | 9620160901 |
| MACHINE | AR-507 |
| COPY | 40084 |
| PRINT | 215984 |
| TOTAL | 256238 |

Table 2 is another example status report generated by a device, e.g., device 110A. In this case, the device is alerting the device manager 202 of a low toner.

TABLE 2

| Field | Example |
| --- | --- |
| Date/Time | 2000/02/27 |
| Device | Cougar34 |
| Model Name | SHARP AR- |
| Installed | $2^{nd}$ Floor |
| Serial | 9620160901 |
| Machine | AR-507 |
| Message | TONER |

The devices 110A, 110B, and 110C transmit the status report to the server 120. The server 120 may be in the same or a different geographic area than the devices 110A, 110B, and 110C.

The server 120, in turn, transmits the status report to the dealer server 150 through a global communication network, e.g., the Internet®. The site server 120 and the dealer server 150 may be a same server or distinct servers. The site server 120 and the dealer server 150 may operate in a same location or in geographically distant locations. For example, the site server 120 may be located in Portland, Oreg., while the dealer server 150 may be located in Vancouver, Wash. Or both may be located at different parts of a same office building.

A device manager 202 retrieves the status report from the dealer server 150. The device manager 202 interprets data included in the status report and provides properly formatted data automatically to the dealer management system 180. The dealer management system 180, in turn, automatically generates a bill to the business owner. A person of reasonable skill in the art knows well the design of the dealer management system 180. We will not discuss the design of the dealer management system 180 in any further detail.

Figure 3:
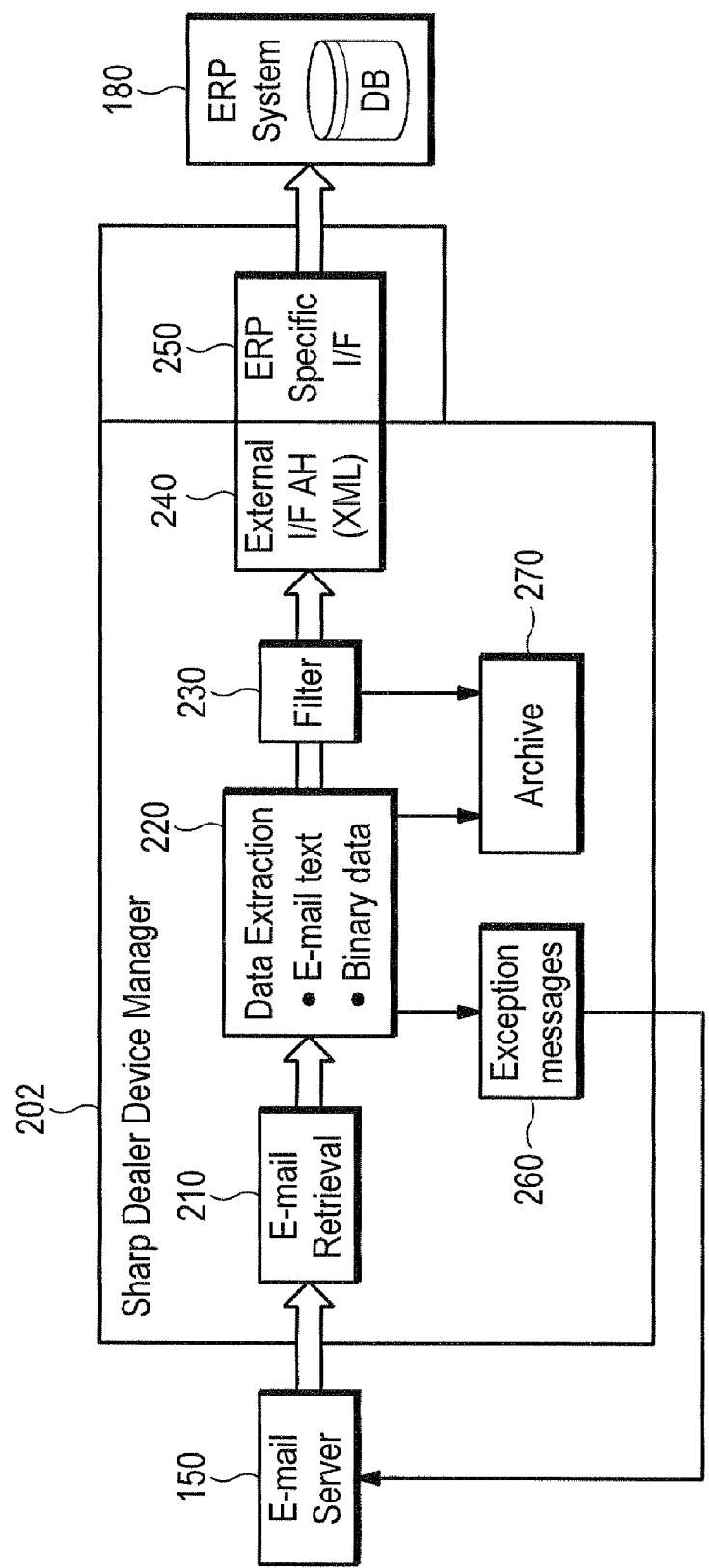
FIG. 3 is a block diagram of an exemplary device management system.

FIG. 3 is a block diagram of the device manager 202. Referring to FIG. 3, the device manager 202 includes an email retrieval component 210, a data extraction component 220, a filter 230, a data preparation component 240, and an interface component 250. And the device manager 202 includes an exception component 260 and an archive component 270. We explain the device manager 202 and its various components in more detail below.

Figure 4:
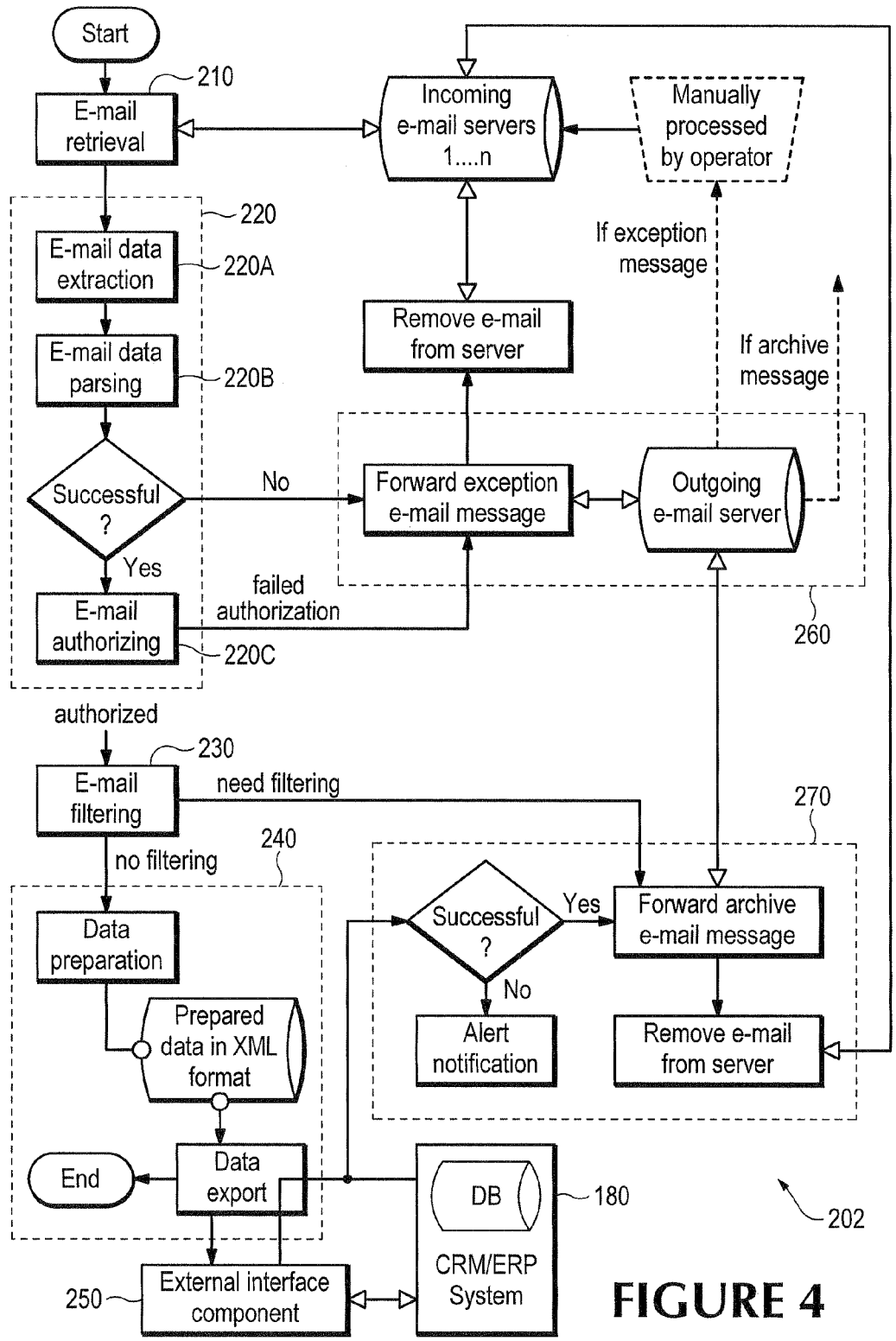
FIG. 4 is a block diagram of an exemplary processing component.

The device manager 202 operates as shown in FIG. 4. Referring to FIGS. 3 and 4, the device manager 202 retrieves an email from the server 150 using the email retrieval component 210. The data extraction component 220 includes three subcomponents: a data extraction subcomponent 220A, a data parsing subcomponent 220B, and an authorizing subcomponent 220C. The data extraction subcomponent 220A extracts data from the email into a collection of raw textual data. The parsing subcomponent 220B parses the extracted data. That is, the parsing subcomponent 220B parses data from the collection of raw textual data. The email authorizing subcomponent 220C determines if the parsed data is authorized for further processing. For example, the email authorizing subcomponent 220C may compare the device identified in the email to a preexisting device list of licensed devices. If the device is not included in the device list because it is not a properly licensed device or because the customer 130 has exceeded its number of properly licensed devices, the device manager 202 and, more particularly, the exception component 260, generates an alert message that it sends to a predetermined email address, e.g., an alert email address. The alert email address is configured at set up.

The filtering component 230 filters the data received from the data extraction component 220. If the data requires no further filtering, the data flows to the data preparation component 240. If additional filtering is required, the email is archived or removed from the server 150 by the archive component 270. The data preparation component 240 transforms (or translated) the extracted data into an intermediate data in a predetermined format, e.g., XML, ready for the interface component 250. The interface component 250 translates the intermediate format data into a format that is appropriate for exporting to the target dealer management system 180. The interface component 250 interacts with the dealer management system 180 to send an alert notification if the data transfer is not successful. The corresponding email message will remain in the incoming email server for subsequent email retrieval.

Figure 5:
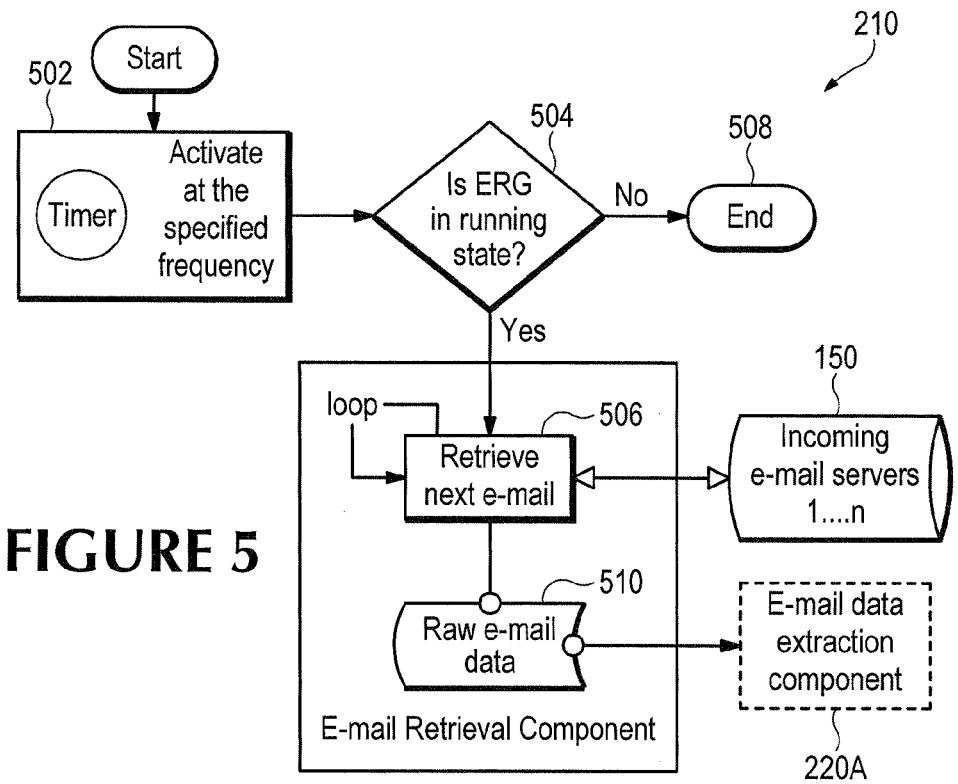
FIG. 5 is a block diagram of an exemplary retrieval component.

FIG. 5 is a block diagram of an exemplary email retrieval component 210. Referring to FIG. 5, the retrieval component 210 retrieves the status report generated by the device, e.g., device 110A, from the server 150. In an embodiment, the retrieval component 210 retrieves an email sent by the device, e.g., device 110A, to a specified incoming email account at the server 150.

The retrieval component 210 activates at a specified frequency configured during setup (box 502). If the device manager 202 is running (box 504), the retrieval component 210 retrieves an email at box 506 from the server 150. If the device manager 202 is not running, the device manager 202 stops at 508. The retrieved email may include raw data 510 in a title, a body, and any number of attachments.

It is possible that a previously retrieved email failed at the point of removal from the server 150. For this reason, the retrieval component 210 may check each email retrieved against the list of previously failed email removals. If it is in the list of failed email removal, then it will not be relayed to the next component.

Figure 6:
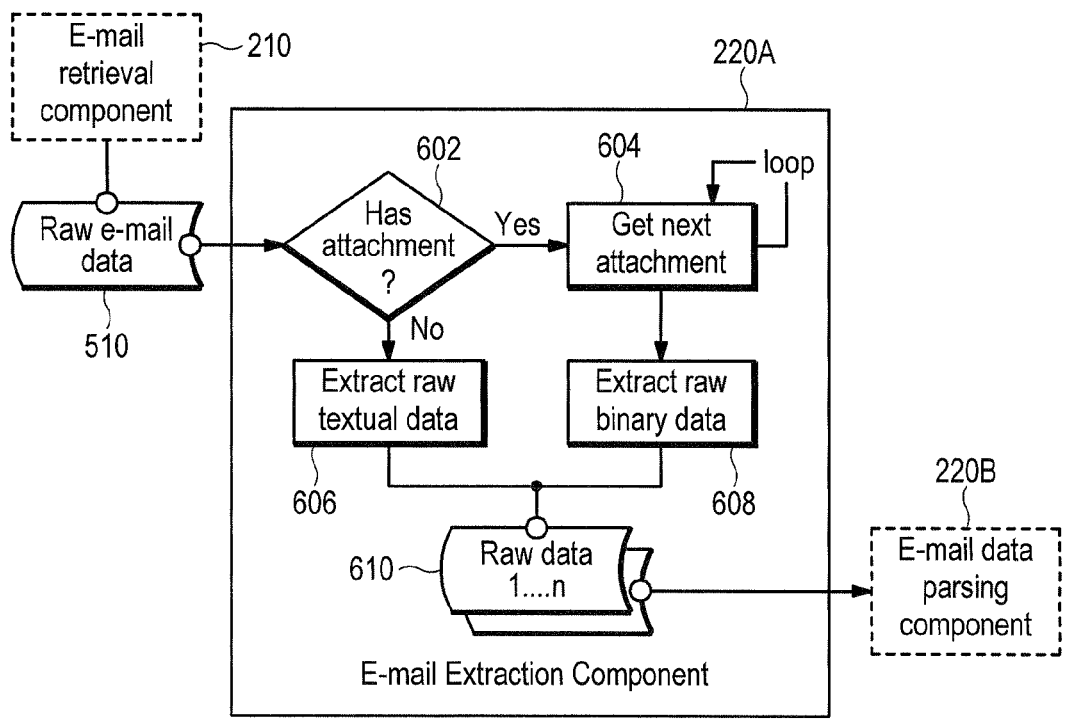
FIG. 6 is a block diagram of an exemplary extraction component.

FIG. 6 is a block diagram of an exemplary extraction subcomponent 220A. Referring to FIG. 6, the extraction subcomponent 220A receives the raw email data 510 from the retrieval component 210. The subcomponent 220A determines whether the email includes any attachments at box 602. If attachments exist, the extraction subcomponent 220A extracts all attachments at 604 and then extracts the raw binary data from all attachments at 608 (if such exists). The attachments may also have textual data that is extracted at 608. If no attachments exist, the extraction subcomponent 220A extracts the raw textual data from e.g., the title and body of the email at 606. The extraction subcomponent 220A compiles the extracted textual and binary data 610 and provides it to the parsing subcomponent 220B. The extracted textual and binary data 610 may include a collection item related to the body that is in textual format while all other collection items may be in binary format.

Figure 7:
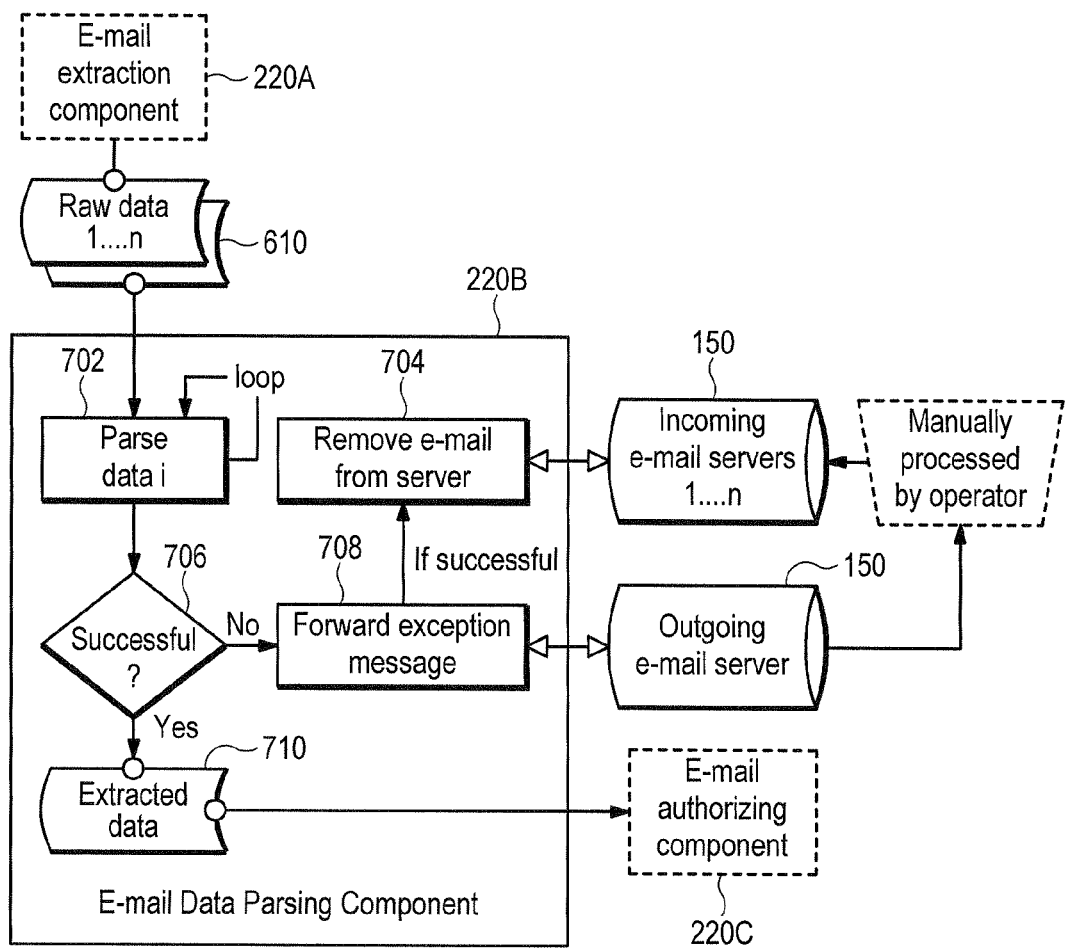
FIG. 7 is a block diagram of an exemplary parsing component.

FIG. 7 is a block diagram of an exemplary parsing subcomponent 220B. Referring to FIG. 7, the parsing subcomponent 220B parses the extracted textual and binary data 610 at box 702. The parsing subcomponent 220B may create an internal data structure with the parsed data 702. At box 706, the parsing subcomponent 220B determines whether the parsing was successful. If it was not (perhaps because of a syntactical error), it forwards an exception message to an exception email address at the server 150 (box 708). The exception message may be the original email forwarded to an exception email address for further human processing. The server 150 may serve both as incoming and outgoing servers, or two different servers may be used depending on the application. If the exception message was successfully forwarded to the server 150 at 708, the parsing subcomponent 220B removes the original email from the (incoming) server 150 at box 704. Exception messages are forwarded to the specified (during configuration) exception email address in their original form and may be manually processed by an operator. In an embodiment, the operator may make the necessary corrections, and re-send the email to be reprocessed by device manager 202.

Figure 8:
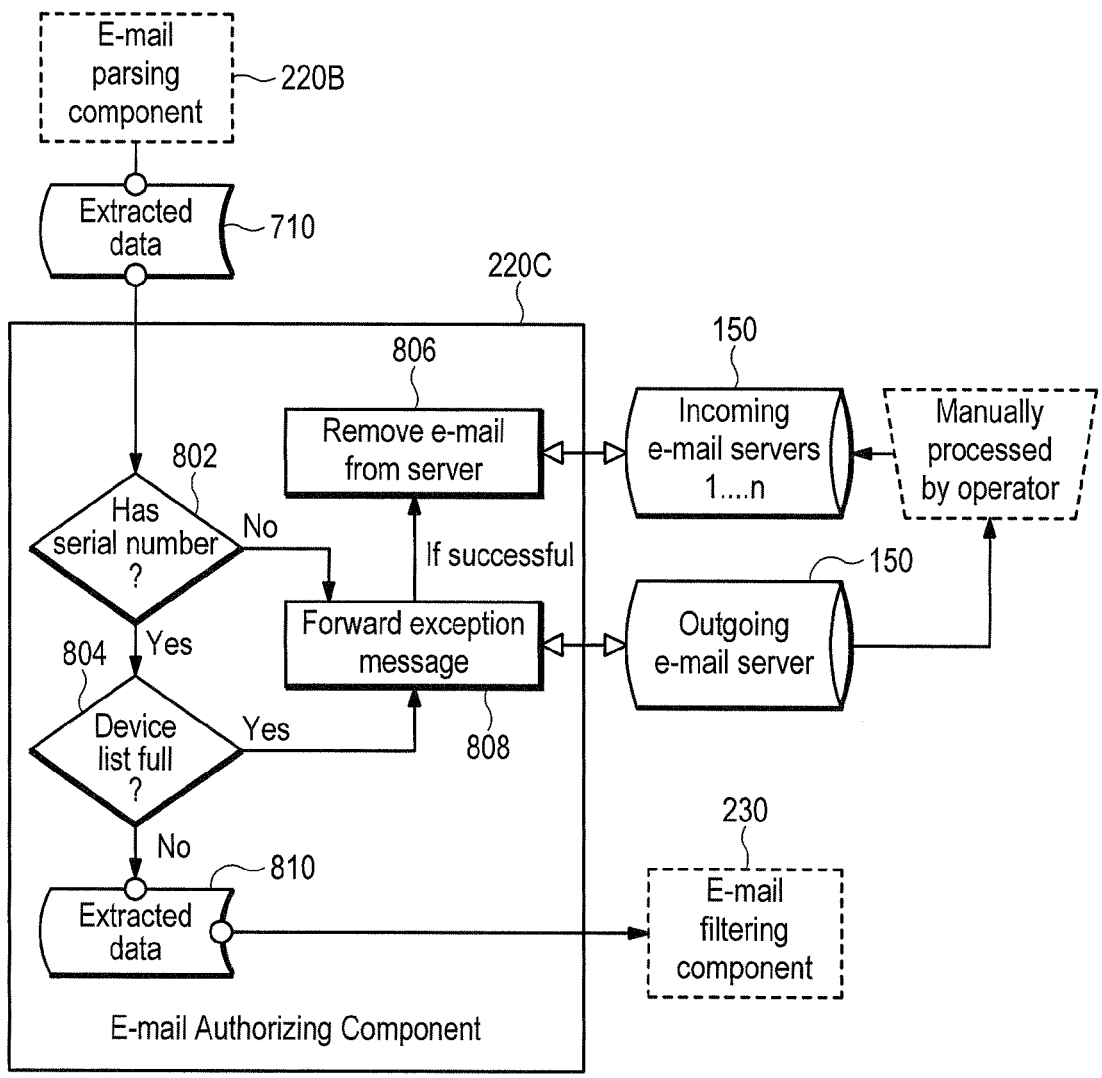
FIG. 8 is a block diagram of an exemplary authorizing component.

FIG. 8 is a block diagram of an exemplary authorizing subcomponent 220C. Referring to FIG. 8, the authorizing component 220C determines whether the extracted data 710 meets one of a predetermined number of authorization conditions. One authorization condition may be detection of a device serial number at box 802. Another authorization condition may be determined by the device list as we explain below. If the authorizing subcomponent 220C does not find a serial number, it forwards an exception message to server 150 at box 808. The server 150 may serve both as incoming and outgoing servers, or two different servers may be used depending on the application as we explained above. If the exception message was successfully forwarded to the server 150 at 808, the authorizing subcomponent 220C removes the original email from (incoming) the server 150 at box 806.

The authorizing subcomponent 220C compares the serial number with a device list. The device list may list devices that are properly licensed to the customer 130 (FIG. 2). The device list may have a preset number of allowable entries, consistent with the level of license. The preset number of allowable entries is controlled by the dealer. For example, the customer 130 may have a 50 device license but currently have only 35 devices operating. The device list, therefore, will list the 35 operating devices and allow for 15 more future entries before generating an exception message indicating a full device list.

The authorization subcomponent 220C may add the device to the list if the device list is not full. The device list may be modified to remove older or non-operating devices and allow additional entries before generating an alert message indicating a full device list. The device list may also inform the dealer (at, e.g., a self identity email address) that the customer 130 is at the limit of his license (if, e.g., the license is for 50 devices and the customer wishes to add an additional 10) and may require a license upgrade (e.g., to a 100 device license from a 50 device license).

Table 3 is a pictorial view of a device list in the device manager 202.

TABLE 3

Sharp Device Manager Configuration

Statistics | E-Mail | Export | General | E-mail File | Devices

This list shows all the devices that are currently active. Devices are automatically added to this list as email is received. Devices will remain active for up to 3 months after the last email is received. A device can be removed immediately by selecting the device and pressing the "Delete" button.

Registration Key

Supported device list

| Serial Nu. | Name | Last Used Date | Machine Code | Model |
|------------|-----------|----------------------|--------------|---------|
| 1050002500 | Machine 1 | Feb. 20, 2003 12:12:4... | ARM-45 | AR-M450 |
| 1050002502 | Machine 3 | Feb. 19, 2003 4:23:32... | ARM-45 | AR-M450 |
| 1050002505 | Machine 5 | Feb. 2, 2003 11:12:46... | ARM-45 | AR-M450 |
| 1050002506 | Machine 6 | Feb. 14, 2003 4:10:30... | ARM-45 | AR-M450 |
| 1050002507 | Machine 7 | Jan. 31, 2003 3:14:20... | ARM-45 | AR-M450 |
| 1050002508 | Machine 8 | Feb. 5, 2003 1:29:18... | ARM-45 | AR-M450 |

Refresh

Delete

Ok | Apply | Cancel | Help

Figure 9:
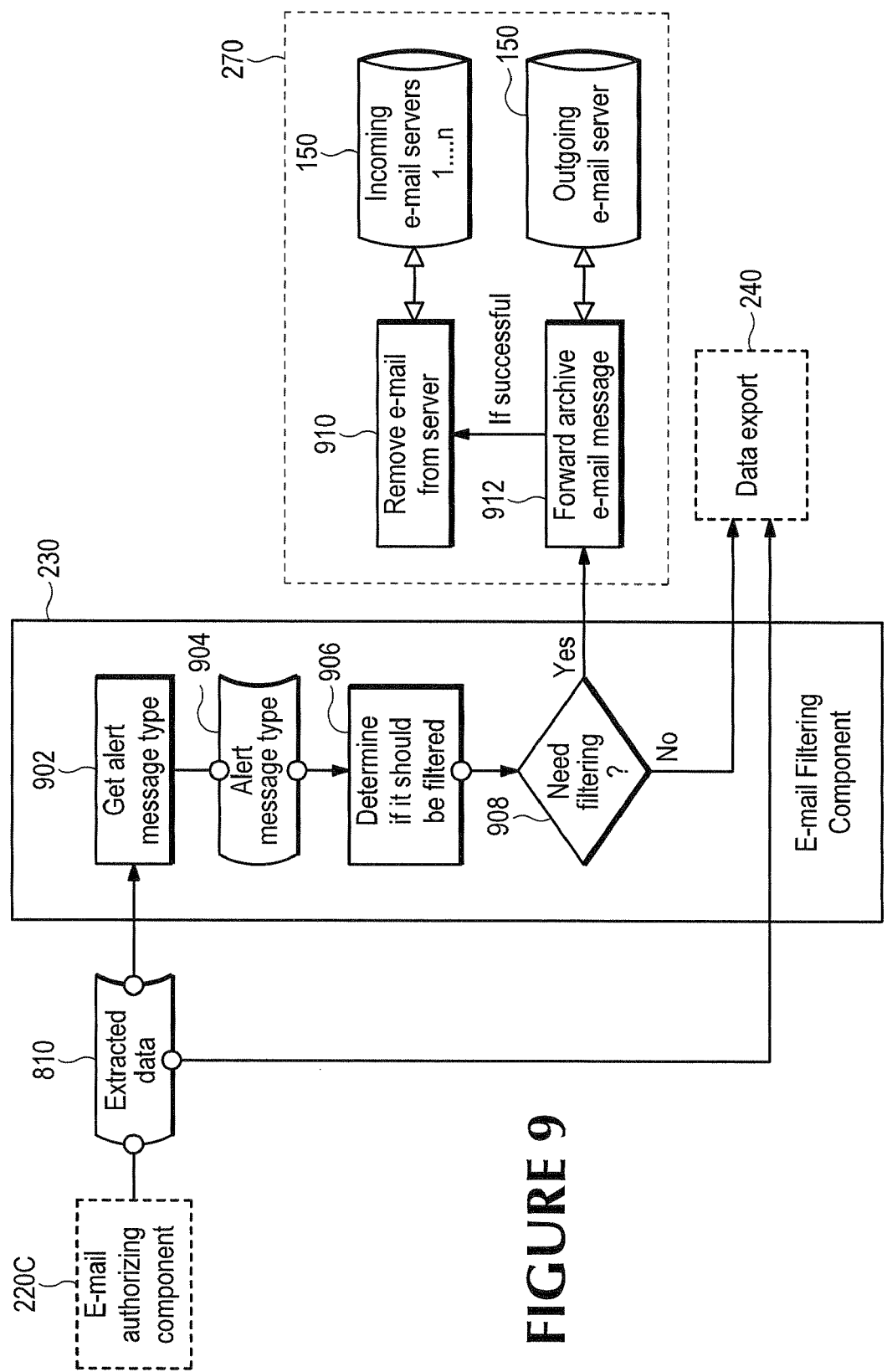
FIG. 9 is a block diagram of an exemplary filtering component.

FIG. 9 is a block diagram of an exemplary filtering component 230. Referring to FIG. 9, the filtering component 230 gets an alert type 904 from the extracted data 810 output from the authorizing subcomponent 220C at box 902. The filtering component 230 determines if the data 810 needs to be filtered at boxes 906 and 908. This determination may be made on any of a plurality of basis, including an alert type. The alert type may be embedded in the email, as shown above in Table 2 (e.g., low toner). The types of alerts necessitating filtering may be configured at set up.

If the data requires additional filtering, the archive component 270 forwards an archive email message to the server 150 at box 912. The archive email message may be the original email forwarded to an archive email address for archiving purposes. If the archive message was successfully forwarded to the server 150 at 912, the filtering component 230 instructs the user to remove the initial email from the server 150 at box 910.

Figure 10:
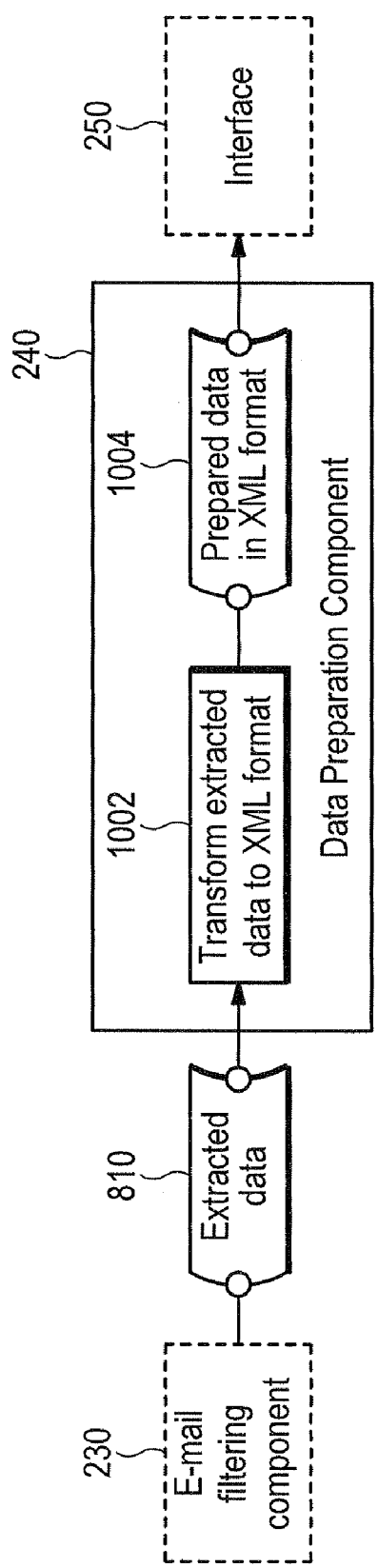
FIG. 10 is a block diagram of an exemplary data preparation component.

FIG. 10 is a block diagram of an exemplary data preparation component 240. Referring to FIG. 10, the data preparation component 240 receives the data 810 from the filtering component 230. At box 1002, the data preparation component 240 transforms the data 810 into data 1004 having a predetermined intermediate format, e.g., XML. The data preparation component 240 provides the data 1004 to the interface component 250.

Figure 11:
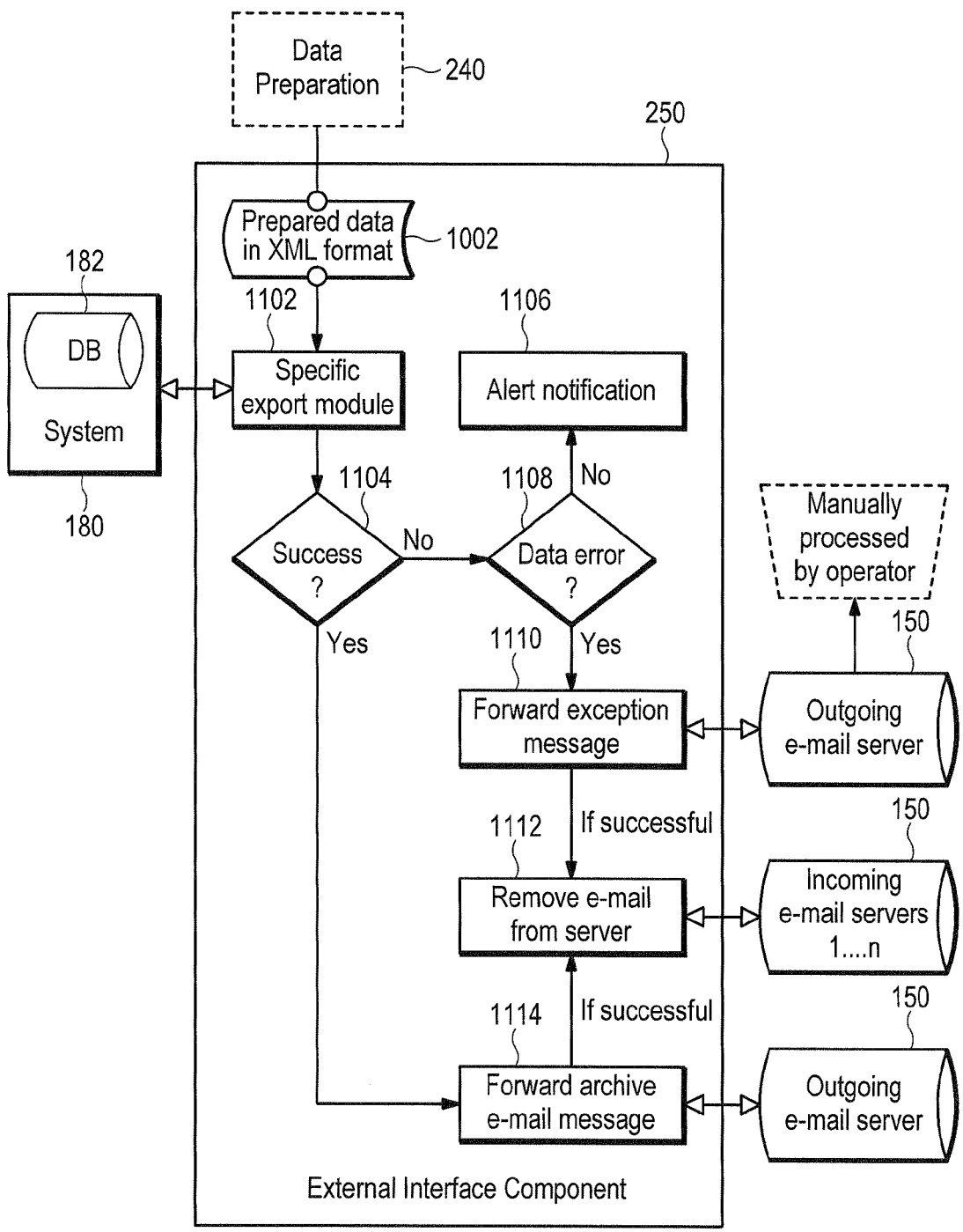
FIG. 11 is a block diagram of an exemplary external interface component.

FIG. 11 is a block diagram of an exemplary interface component 250. Referring to FIG. 11, the interface component 250 exports the data 1002 to the dealer management system 180 (box 1102). The exported data module may be in the form of a Windows® dynamic link library (DLL) file. If the interface 250 successfully exports the data (box 1104), it forwards an archive email message to the server 150 (box 1114). If the interface 250 successfully sends an archive email to the server 150 responsive to the successful exportation, it removes the email from the (incoming) server 150 (box 1112).

If, on the other hand, the interface 250 fails to export the data (box 1104) and detects data errors (box 1108), e.g., an unrecognizable device name and/or serial number, it forwards an exception email to the (outgoing) server 150 at box 1110. If the interface does not detect data errors, it instead sends an alert notification to the user or operator.

The dealer management system 180 populates its database 182 with the data 1002 exported by the interface 250.

While we have illustrated and described this invention with reference to some embodiments, those skilled in the art will understand that they may make various changes in form and detail without departing from the spirit and scope of the invention as defined by the following claims.

We claim:

1. A device management system for remote management of an office equipment device, comprising:
   a reception server to receive a status communication from at least one office equipment device; and
   a device manager software component coupled to the reception server for:
      parsing the status communication;
      extracting management information data including an alert type from the status communication;
      determining whether the parsing was successful, wherein if the parsing was not successful then sending an exception message to an exception email address at the reception server and removing an original instance of the status communication from the reception server responsive to sending the exception message, else forwarding the extracted management information data for authorization;
      determining whether the office equipment device is authorized based on the management information, wherein if the office equipment device is not authorized then sending the exception message to the reception server and removing the status communication from the reception server responsive to successfully sending the exception message, else forwarding the extracted management information data for filtering;
      determining if the management information requires filtering based on the alert type detected during the parsing, wherein if the extracted management information data requires additional filtering then sending the exception message to the exception email address at the reception server and removing the original instance of the status communication from the reception server,
      else, forwarding the management information data to a formatting module;
      transforming the extracted management information data into a predetermined intermediate format, wherein if an error is encountered during the transforming then forwarding the extracted management information to an exception server for manual processing and removing the original instance of the status communication from the reception server, else forwarding the formatted management information data for exporting; and
      exporting the formatted management information data for entry into an office equipment dealer management system, wherein the formatted management information data includes identification of the office equipment device and click count information to reflect usage of the identified office equipment device, wherein if the exporting is successful then removing the original instance of the status communication from the reception server, else sending the exception message to the exception email address at the reception server.

2. A method for automatically conveying management information from an office equipment device into a remote equipment dealer management system, comprising:
   generating a device status report in an office equipment device wherein the device status report includes click count information and device location;
   transmitting the device status report to a server;
   retrieving the device status report from the server, the device status report including an alert type;
   extracting textual or binary data, or combinations thereof from the device status report and corresponding attachments;
   parsing the extracted textual and binary data;
   creating an internal data structure with the extracted data;
   determining whether the parsing was successful, wherein if the parsing was not successful then sending an exception message to an exception email address at the server and removing an original instance of the device status report from the server, else forwarding the extracted data for authorization;
   determining if the extracted data meets a predetermined authorization condition indicating that an associated office equipment device is properly licensed, wherein if the extracted data is not authorized then sending the exception message to the exception email address at the server and removing the original instance of the device status report from the server, else, forwarding the extracted data for filtering;
   determining if the extracted data requires filtering based on the alert type, wherein if the extracted data requires additional filtering then sending the exception message to the exception email address at the server and removing the original instance of the device status report from the server, else, forwarding the extracted data for formatting;

formatting the extracted data for export to the equipment dealer management system, wherein the formatted data includes the click count information, wherein if an error is encountered during the formatting then forwarding the formatted data to an exception server for manual processing and removing the original instance of the device status report from the server, else, forwarding the formatted data for transmitting; and transmitting the formatted data electronically to the equipment dealer management system, wherein if the transmission is successful then removing the original instance of the device status report from the server, else, sending the exception message to the exception email address at the server.

3. The device management system of claim 1, wherein the exception message is a copy of the status communication.

4. The device management system of claim 3, further comprising, if the parsing was not successful, transmitting the exception message to the exception email address for further human processing.

5. The device management system of claim 1, wherein the device manager software component is further for retrieving the status communication and comparing the status communication to a list of previously retrieved status communications that failed at a point of retrieval, wherein if the status communication matches one of the listed previously retrieved status communications that failed at a point of retrieval then terminating further relay of the status communication, else relaying the status communication for further processing.

* * * * *